(12) United States Patent
Ohki (10) Patent No.: US 9,544,524 B2
(45) Date of Patent: Jan. 10, 2017

(54) REMOTE CONTROLLER, REMOTE CONTROL SYSTEM AND PROGRAM

(75) Inventor: Yoshihito Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 999 days.

(21) Appl. No.: 12/855,339

(22) Filed: Aug. 12, 2010

(65) Prior Publication Data

US 2011/0043372 A1 Feb. 24, 2011

(30) Foreign Application Priority Data

Aug. 24, 2009 (JP) .............................. P2009-193429

(51) Int. Cl.
G05B 11/01 (2006.01)
H04N 5/44 (2011.01)
H04N 21/422 (2011.01)

(52) U.S. Cl.
CPC ........ *H04N 5/4403* (2013.01); *H04N 21/4222* (2013.01); *H04N 21/42204* (2013.01); *H04N 21/42209* (2013.01); *H04N 21/42224* (2013.01); *H04N 2005/443* (2013.01); *H04N 2005/4425* (2013.01)

(58) Field of Classification Search
CPC ..... G08C 17/02; G08C 19/00; G08C 2201/93; G08C 17/00; G06F 3/0416; G06F 3/041; G06F 3/044; G06F 3/0412; G06F 3/0482; G06F 3/04842; G06F 3/04817; G06F 3/04883; G06F 3/0488; G06F 3/0486
USPC ................. 340/12.22; 341/23; 345/172, 173; 715/761–764, 765, 769, 773, 810
See application file for complete search history.

(56) References Cited

U.S. PATENT DOCUMENTS

| | | | |
|---|---|---|---|
| 6,473,069 B1* | 10/2002 | Gerpheide | 345/157 |
| 8,139,026 B2* | 3/2012 | Griffin | 345/156 |
| 2009/0183098 A1* | 7/2009 | Casparian et al. | 715/765 |
| 2009/0237359 A1* | 9/2009 | Kim et al. | 345/168 |
| 2009/0319935 A1* | 12/2009 | Figura | 715/773 |

FOREIGN PATENT DOCUMENTS

JP    A-2003-32509    1/2003

OTHER PUBLICATIONS

IBM, Touch screen keyboard with self correcting positional capability [Online], Jun. 3, 2003 [retrieved on Apr. 3, 2013]. Retrieved from the Internet: URL: http://ip.com/IPCOM/000012853.*

* cited by examiner

*Primary Examiner* — Kerri McNally
*Assistant Examiner* — Sharmin Akhter
(74) *Attorney, Agent, or Firm* — Paratus Law Group, PLLC (57) ABSTRACT

A user interface apparatus, a method for controlling a user interface apparatus, and a computer-readable medium are provided. The user interface apparatus includes a display unit comprising an object display area, the display unit displaying an object in the object display area; a detection area control unit that (1) defines a detection area for the object, the detection area including the object display area and having a size and a location, and (2) changes at least one of the size and the location of the detection area to create a modified detection area; and an activation detection unit that detects a position of a user activation. Furthermore, the detection area control unit changes the detection area after the activation detection unit detects the activation position as being within the detection area.

22 Claims, 11 Drawing Sheets

REMOTE CONTROLLER, REMOTE CONTROL SYSTEM AND PROGRAM

BACKGROUND

Technical Field

The present invention relates to a remote controller, a remote control system and a program.

Description of the Related Art

There has been known a remote controller such as a remote controller for remote controlling an external device such as a television receiver. Generally, the status of the external device changes in response to an operation of the remote controller, so that a user can confirm the execution of the operation through the change in the status of the external device. Thus, once the user has confirmed an arrangement of operation elements on the remote controller, the user tends to continue a desired operation in a state of paying attention to the external device without looking at the remote controller.

Here, in the case of operating operation elements provided to the remote controller in the form of hardware, the user can confirm the arrangement of the operation elements to some extent by the sense of touch and can also correct the position of a finger if necessary even without looking at the remote controller. This enables the user to continue the desired operation while paying attention to the external device to some extent. On the other hand, as disclosed in JP-A-2003-32509, there is also a case of operating operation elements provided to the remote controller in the form of software, such as a software keyboard.

In this case, even when the user has once confirmed the arrangement of the operation elements, the user is difficult to confirm the arrangement of the operation elements by the sense of touch as well as to correct the position of the finger if necessary. Accordingly, if the position of the finger is involuntarily moved through a continuous operation, an erroneous operation may occur without an operation of a desired operation element. Thus, the user may not be able to continue the desired operation while paying attention to the external device to some extent.

In light of the foregoing, it is desirable to provide a remote controller, a remote control system and a program by which a desired operation can be continued even while paying attention to an external device to some extent. For example, it is desirable to provide a user interface apparatus, a method for controlling a user interface apparatus, and a non-transitory computer-readable medium.

SUMMARY

In accordance with exemplary embodiments, there is provided a user interface apparatus including a display unit comprising an object display area, the display unit displaying an object in the object display area; a detection area control unit that defines a detection area for the object, the detection area including the object display area and having a size and a location, and changes at least one of the size and the location of the detection area to create a modified detection area; and an activation detection unit that detects a position of a user activation. Furthermore, the detection area control unit changes the detection area after the activation detection unit detects the activation position as being within the detection area.

DETAILED DESCRIPTION

Hereinafter, embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Configuration of a Remote Control System

Figure 1:
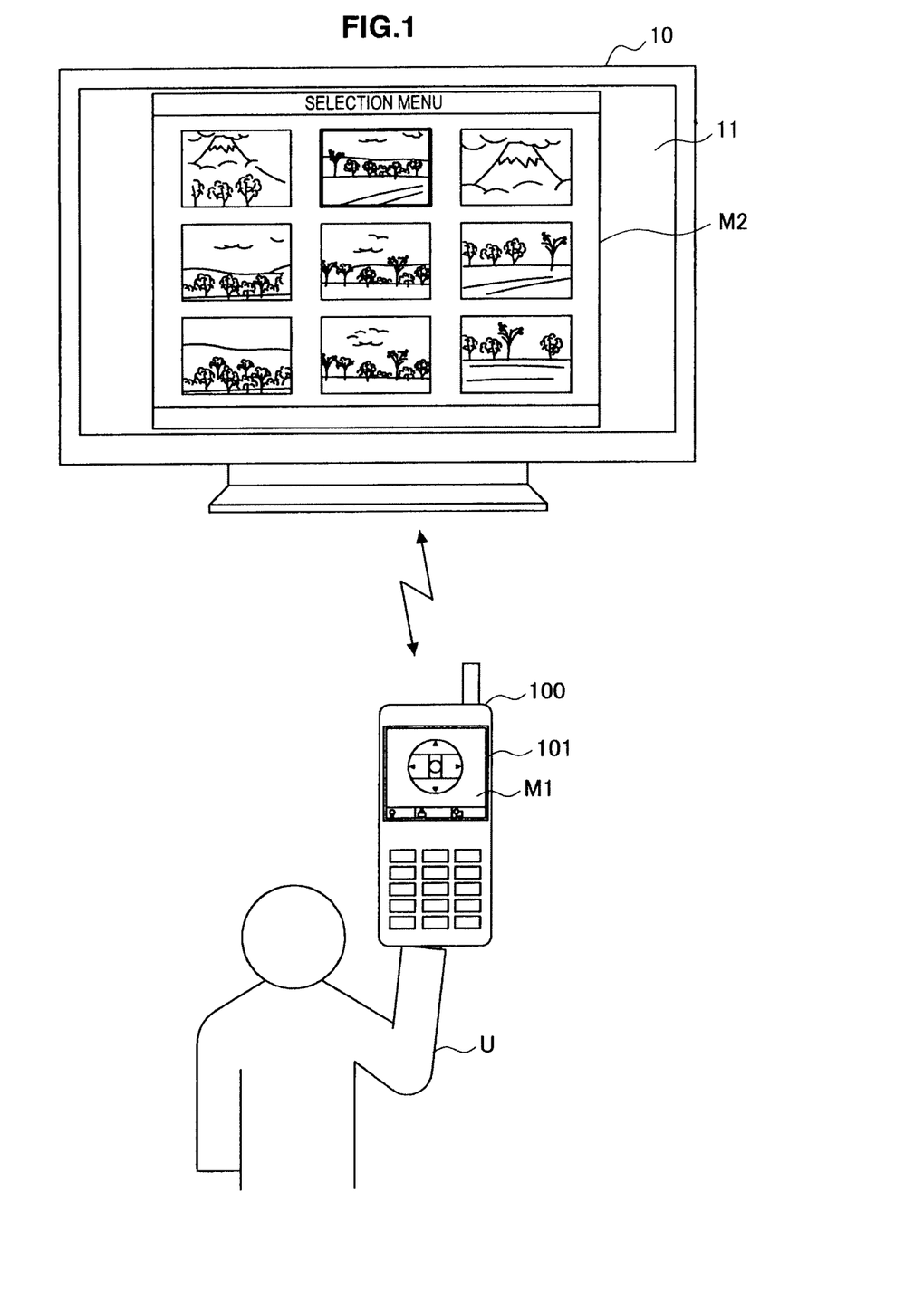
FIG. 1 is a diagram showing a remote control system consistent with an embodiment of the present invention.
Figure 2:
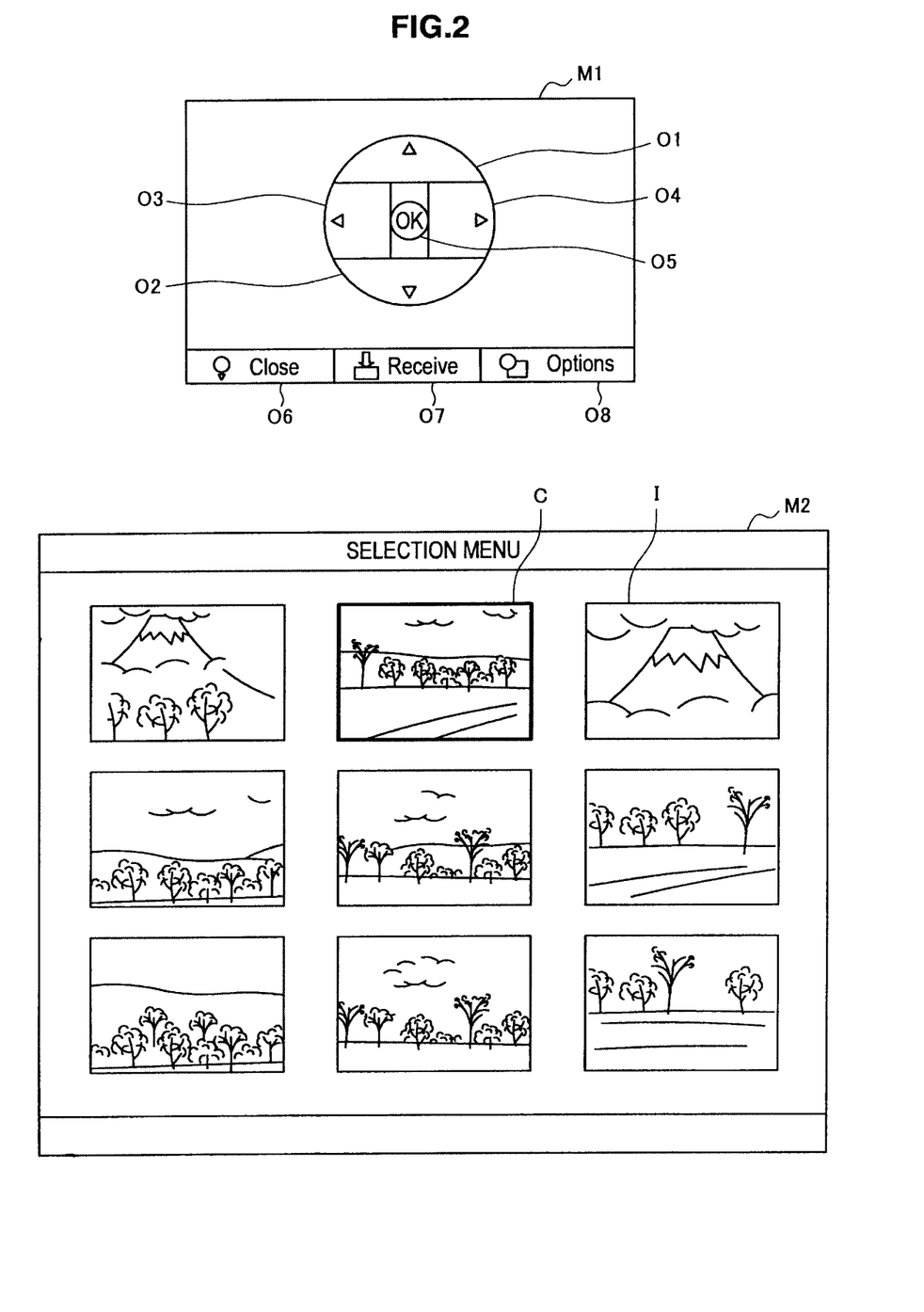
FIG. 2 are diagrams showing GUIs displayed on a mobile phone and a television.

A configuration of a remote control system will be first described with reference to FIG. 1 and FIG. 2. FIG. 1 is a diagram showing the remote control system consistent with an embodiment of the present invention. FIG. 2 are diagrams showing GUIs (Graphical User Interface), M1 and M2 displayed on a mobile phone and a television.

The remote control system includes a user interface apparatus, for example, mobile phone 100 (remote controller) and a television receiver 10 (external device: referred to as "television 10" hereinafter). In addition, the remote controller may be a dedicated remote controller for television including a display unit or a versatile remote controller besides the mobile phone 100, and the external device may be a personal computer including a display unit, a projector, an audio device or the like besides the television 10.

The mobile phone 100 includes an interface for network connection, infrared communication or the like, and a display panel 101 and implements a GUI application for remote controlling an external device including the television 10. The television 10 includes an interface for network connection, infrared communication or the like, and a display 11 and implements a GUI application (GUI menu, photo browser, Web browser or the like) which can be controlled by a remote controller including the mobile phone 100. The mobile phone 100 and the television 10 are communicable with each other via wire or wirelessly at least in a direction from the mobile phone 100 to the television 10.

As shown in FIG. 2, on the display panel 101 of the mobile phone 100, up, down, left, and right move (↑↓←→) buttons O1 to O4, an enter (OK) button O5, and option buttons O6 to O8 are each displayed as an object in one or more object display areas on an operation menu M1. On the display 11 of the television 10, a cursor C as well as an array of thumbnails I are displayed as a selection menu M2 of a photo browser, for example.

A user U moves the cursor C on a desired thumbnail I by operating the up, down, left, and right move (↑↓←→) buttons O1 to O4 and selects the thumbnail I by operating enter button O5. Here, when each of the buttons O1 to O5 is operated, an execution instruction of processing (e.g., movement of the cursor C) assigned to each of the buttons O1 to O5 is transmitted through a communication unit to the television 10, and the television 10 executes predetermined processing based on the execution instruction. Moreover, the user U operates option buttons O6 to O8 and thereby selects the execution of option processing assigned to each of the option buttons O6 to O8 and causes the television 10 or the mobile phone 100 to execute predetermined processing.

Here, in the mobile phone 100, one or more objects O assigned predetermined processing to be executed by the television 10 are displayed on the panel 101, and contact and a contact position P of a finger of the user U or the like on the display panel 101 are detected. A predetermined detection area A for detecting an operation on the object O is set for each object O. A tap operation within the detection area A of the object O is detected as a trigger. Then, in the mobile phone 100, when the trigger is detected, the detection area A of the object O is reset so that the detection area A of the object O shifts to the side of the contact position P of a finger at the time of the tap operation.

2. Configuration of Mobile Phone 100

Figure 3:
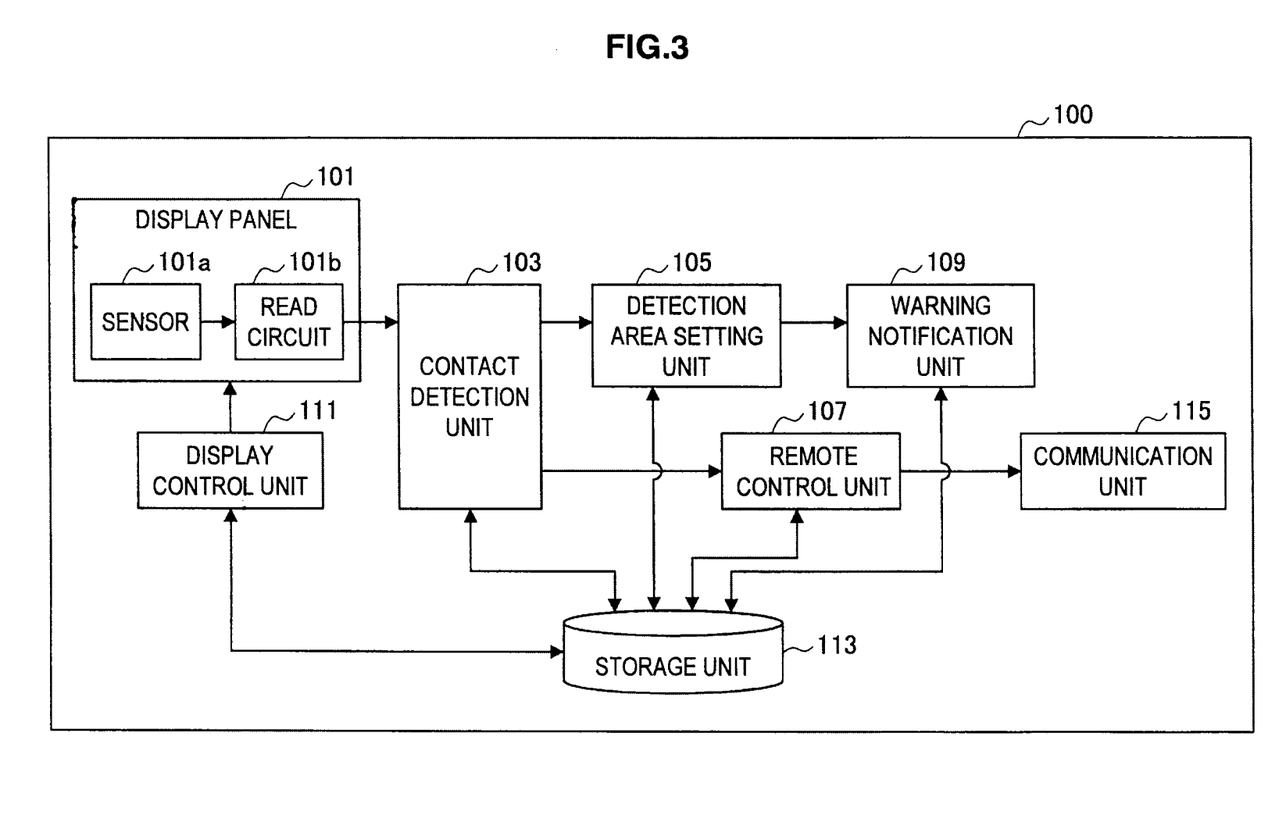
FIG. 3 is a block diagram showing a basic configuration of the mobile phone according an exemplary embodiment of the present invention.

FIG. 3 is a block diagram showing a basic configuration of the mobile phone 100 consistent with an embodiment of the present invention. The mobile phone 100 includes a display panel 101; a contact or activation detection unit 103; a detection area control unit, for example, a detection area setting unit 105; a remote control unit 107; a warning unit, for example, a warning notification unit 109, a display control unit 111; a storage unit 113; and a communication unit 115.

The display panel 101 displays display data provided from the display control unit 111 and detects a pointer such as a finger of the user U or the like in contact with the display panel 101. In addition, the pointer is not limited to the finger of the user U and may be something that can indicate contact/non-contact and a contact position with the display panel, such as a stylus pen, a pointing device or the like. The display panel 101 displays, in particular, the object O based on object data set for each arbitrary object O included in a GUI, such as an icon, a button, a thumbnail, and/or an image.

The display panel 101 includes a sensor 101a of such as pressure type, capacitive type, optical type (a case of the sensor 101a will be assumed in the following), or ultrasonic type and a read circuit 101b. The sensor 101a detects the pointer in contact with the display panel 101, and the read circuit 101b provides a detection state of the pointer by the sensor 101a as detection data to the contact detection unit 103.

Figure 5:
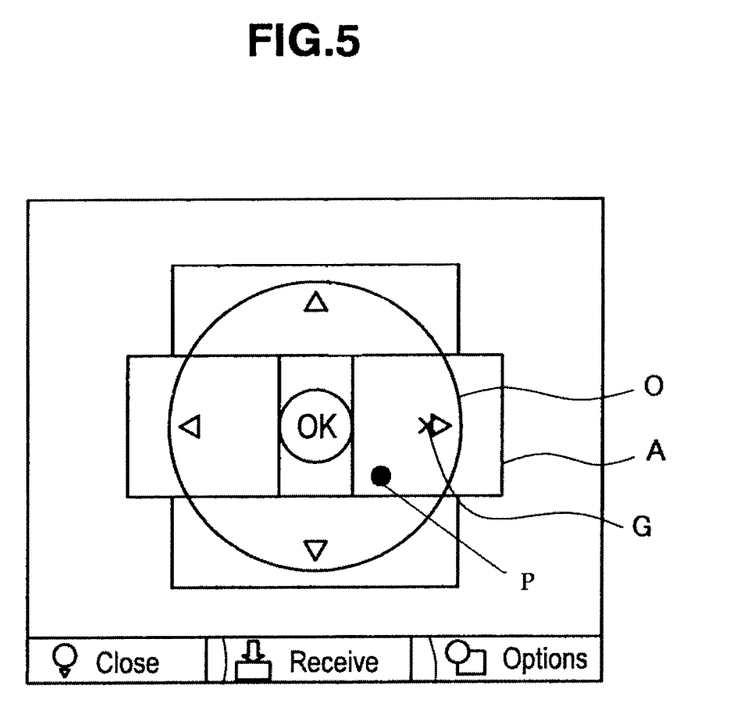
FIG. 5 is a diagram for explaining the remote control method consistent with an embodiment of the present invention.

As shown in FIG. 5, the contact detection unit 103 detects the contact/non-contact and the contact position P of the pointer or other user activation based on the detection data provided from the read circuit 101b. An object O within whose detection area A is detected the contact of the pointer is set as an operation target object Ot. The contact detection unit 103 detects the tap operation (change from the contact state to the non-contact state of the pointer) within the detection area A of the object O as a trigger and provides the trigger to the detection area setting unit 105 and optionally, to the remote control unit 107.

The detection area setting unit 105 sets the predetermined detection area A for each of the objects O on the display panel 101. The predetermined detection area A is set based on the object data preliminarily stored in the storage unit 113. The predetermined detection area A is set as an area including the display area of the object O, and a predetermined reference point is set in the detection area A. In the following, there will be assumed a case where the reference point is set to the center G of the detection area A.

When the trigger is detected by the contact detection unit 103, the detection area setting unit 105 changes at least one of the size and the location of the detection area, for example, by resetting the detection area A so that the detection area A of the object O shifts to the side of the contact position P of the pointer at the time of the tap operation. In the following, there will be assumed a case where the detection area A is reset so that the center G of the detection area A shifts to the contact position P of the pointer at the time of the tap operation, in particular. This facilitates the user U to continue a desired operation in the case of continuously operating the same operation target object Ot.

Moreover, the detection area setting unit 105 initializes the detection area A (restores the detection area A to the predetermined detection area A) in the case where an operation on an arbitrary object O is not detected for a predetermined reset time after the detection area A has been reset. This enables the user U to start a desired operation, at the time of starting the operation on the object O (it is assumed that the user confirms the arrangement of the objects O), based on the predetermined detection areas A corresponding to the arrangement of the objects O.

Moreover, the detection area setting unit 105 initializes the detection area A when the shift amount of the detection area A exceeds a predetermined warning threshold value and the shift amount of the detection area A exceeds a predetermined cancellation threshold value, as described below. Here, the warning threshold value is set as shift amount in the case where, for example, at least a part of the detection area A deviates from the display range of the display panel 101 due to the reset of the detection area A, and the cancellation threshold value is set as shift amount which exceeds the deviation amount of the detection area A. By this, massive reduction of operability can be prevented beforehand.

When the tap operation (corresponding to the trigger) is detected within the detection area A of the object O, the remote control unit 107 transmits to the television 10 via the communication unit 115 an execution instruction of the processing assigned to the object O. In addition, the remote control unit 107 may transmit the execution instruction in the case where contact (tap operation) of the pointer is detected within the detection area A of the object O instead of the case where the tap operation is detected.

When the shift amount of the detection area A exceeds the predetermined warning threshold value, the warning notification unit 109 notifies the user of a warning via a warning means. By this, when reduction of operability is expected, it is possible to prompt the user to reconfirm the arrangement of the objects O. The warning means may be a vibrator, a speaker or the like provided in the mobile phone 100 or may be a display, a speaker or the like provided in the television 10, though they are not shown in figures.

The display control unit 111 controls the display by the display panel 101 and particularly controls the display of the object O. In order to control the display of the object O, the display control unit 111 provides image data of the object O to the display panel 101 based on the object data stored in the storage unit 113.

The storage unit 113 stores the object data by associating the object data with ID of the object O. The object data includes the image data of the object O, data indicating the display position and area of the object O, data of the detection area A of the object O, and data indicating the assigned processing or the like of the object O. Here, the data of the detection area A includes initial data indicating the predetermined detection area A and updated data that is updated according to the reset of the detection area A.

The communication unit 115 includes a means of network connection, infrared communication or the like and transmits and receives data, an instruction and the like to and from the external device such as the television 10. The communication unit 115 transmits the execution instruction of the processing assigned to the object O to the television 10 according to instruction of the remote control unit 107, in particular.

In addition, each of the components of the user interface apparatus, such as mobile phone 100, may be configured by using a general-purpose member and/or circuit or may be configured by hardware specialized for the function of each of the components. For example, a non-transitory computer-readable medium may be provided, tangibly embodied in a storage device encoded with instructions which, when executed on a processor, perform methods disclosed herein. Moreover, at least a part of the function of each of the components may be realized by a program executed on a CPU. A remote control method consistent with an embodiment of the present invention may be realized by the program executed on the CPU of the mobile phone 100.

3. First Embodiment

In the following, a remote control method consistent with a first embodiment of the present invention will be described with reference to FIG. 4 and FIGS. 5A to 5D. FIG. 4 and FIGS. 5A to 5D are a flow diagram and explanatory diagrams showing the remote control method consistent with the first embodiment of the present invention.

Figure 4:
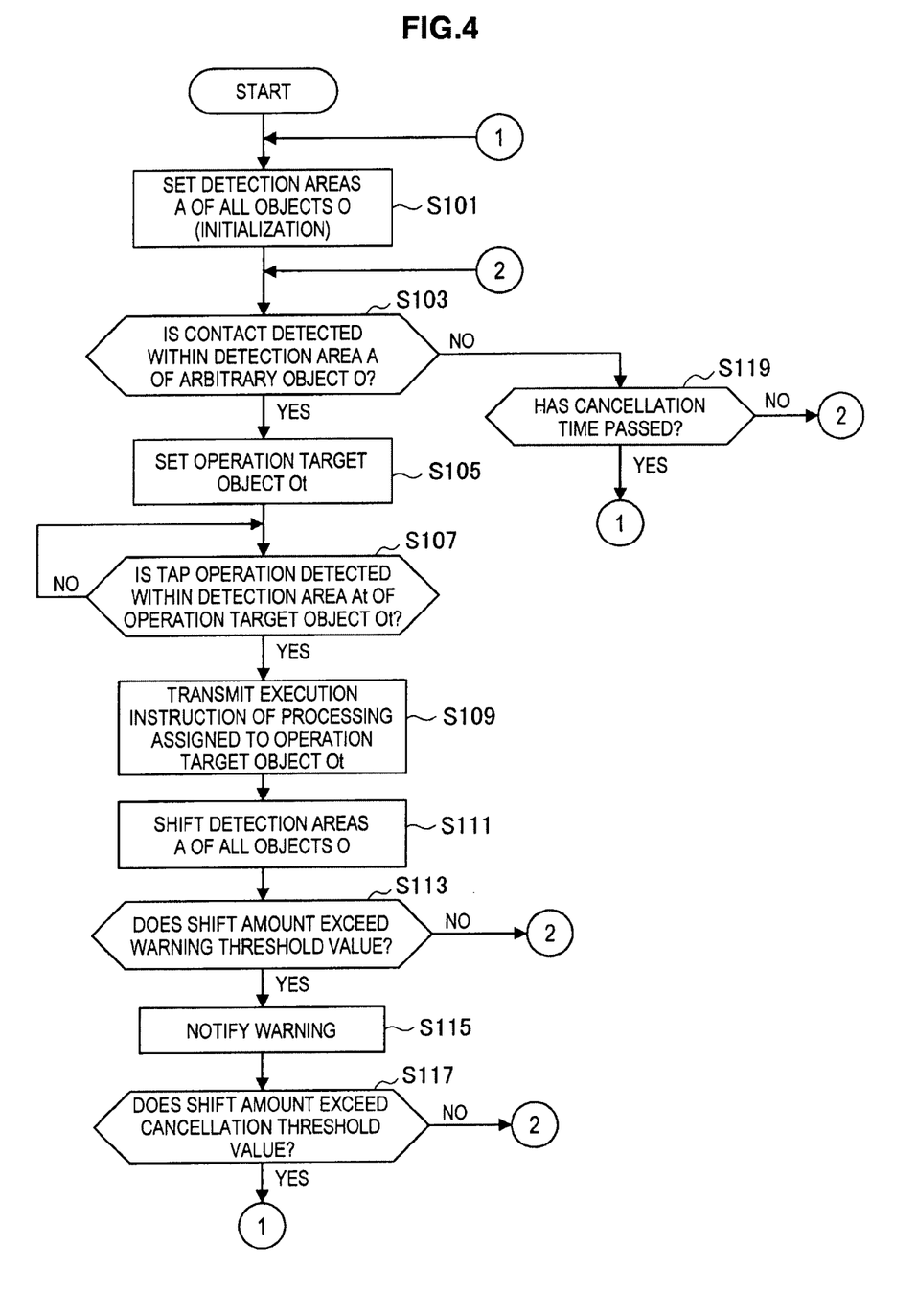
FIG. 4 is a flow diagram showing a remote control method consistent with a first embodiment of the present invention.
Figure 5A:
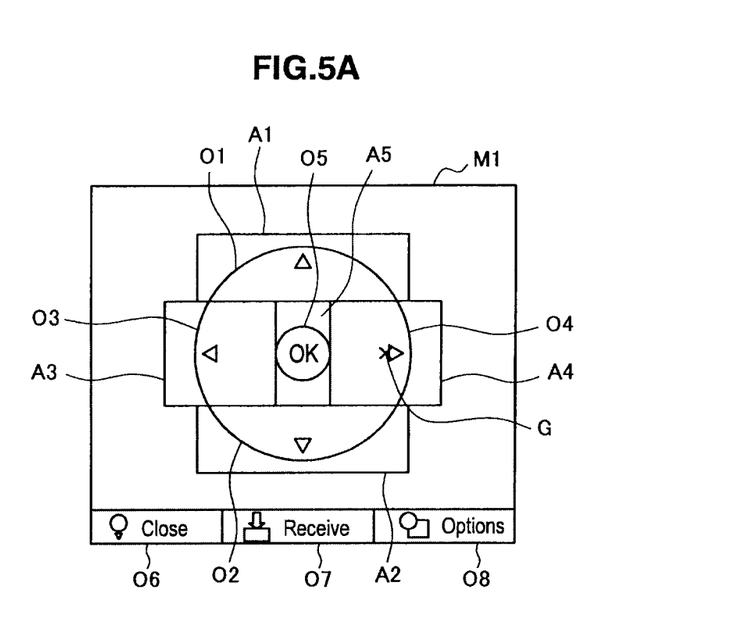
FIG. 5A is a diagram for explaining the remote control method consistent with the first embodiment of the present invention.
Figure 5B:
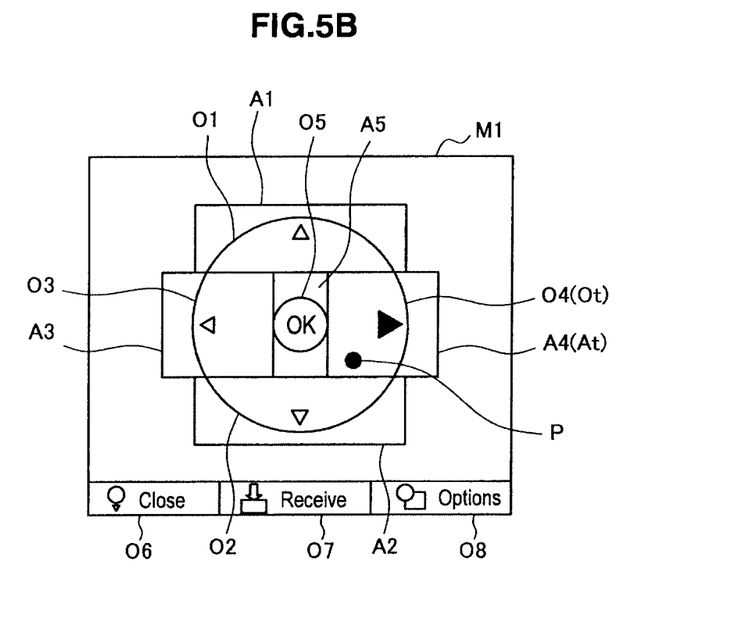
FIG. 5B is a diagram for explaining the remote control method consistent with the first embodiment of the present invention.
Figure 5C:
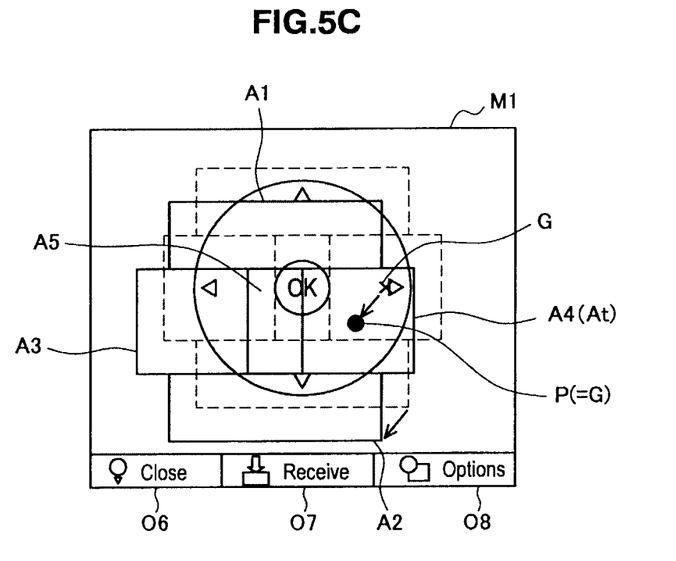
FIG. 5C is a diagram for explaining the remote control method consistent with the first embodiment of the present invention.

The detection area setting unit 105 sets (initialize) a predetermined detection area A for each object O based on the object data (step S101). Here, as shown in FIG. 5A, each of the predetermined detection areas A (A1 to A5) is exclusively set so as to include the display area of each of the objects O (buttons O1 to O5). In addition, the detection area A is not limited to a rectangular shape and may be set to an arbitrary shape.

The contact detection unit 103 determines whether contact of the pointer is detected within the detection area A of an arbitrary object O (S103). When the contact is detected, the object O whose contact has been detected within the detection area A is set as an operation target object Ot (S105).

Here, the display control unit 111 may create a modified object by, for example, changing the display of the operation target object Ot (corresponding to the button O4 in FIGS. 5A TO 5D) so that the setting status of the operation target object Ot is visible to the user U. In addition, in FIGS. 5A TO 5D, a contact position P of the pointer is shown by a filled circle.

When the operation target object Ot is set, the contact detection unit 103 determines whether a tap operation by the pointer is detected within the detection area A (At) of the operation target object Ot (S107). In the case where the tap operation is detected, the contact detection unit 103 considers the tap operation as a trigger and provides the trigger to the remote control unit 107 and the detection area setting unit 105. Here, the contact detection unit 103 may provides the trigger to the detection area setting unit 105 only in the case where the same object O is continuously set as the operation target object Ot.

In addition, in FIGS. 5A TO 5D, there is assumed a case where, after the detection of the contact, a drag operation by the pointer is not performed and non-contact is detected. Accordingly, in the case where the non-contact is not detected, the detection determination of the non-contact (S107) is repeated. However, there may be assumed a case where the contact position P of the pointer is changed by a drag operation after the detection of the contact. In this case, there is determined whether the contact is detected outside the detection area At of the operation target object Ot and when the determination is positive, the determination of the detection status (S103) may be performed again.

When provided with the trigger, the remote control unit 107 transmits to the television 10 via the communication unit 115 a processing instruction, such as, for example an execution instruction of the processing assigned to the object O, based on the object data (S109).

When provided with the trigger, the detection area setting unit 105 resets (shifts) the detection areas of all the objects O (S111). Here, in FIGS. 5A TO 5D, the term "all the objects" refers to the up, down, left, and right move buttons O1 to O4 and the enter button O5 but may include the option buttons O6 to O8.

The detection area setting unit 105 changes at least one of the size and location of the detection area to create a modified detection area, for example, by resetting the object data of all the objects O1 to O5 so that the modified detection area, for example, detection area A4 (At) of the button O4 (the operation target object Ot), shifts to the side of the contact position P of the pointer at the time of the tap operation. Here, the detection area A4 of the button O4 is shifted so that the center G of the original detection area A4 is the contact position P of the pointer at the time of the tap operation. The detection areas A1 to A3 and A5 of the other buttons O1 to O3 and O5 are shifted in conjunction with the shift of the detection area A4 of the button O4.

Here, the detection area setting unit 105 sets reset information indicating the reset of the detection area A. The reset information includes ID of the operation target object Ot and the reset time.

When the detection area A is reset, the warning notification unit 109 determines whether the shift amount of the detection area A exceeds a predetermined warning threshold value (S113). Then, in the case where the shift amount exceeds the warning threshold value, the warning notification unit 109 generates a warning signal, for example, by notifying the user U of a warning via a warning means (S115).

In the state in which the shift amount of the detection area A exceeds the predetermined warning threshold value, the detection area setting unit 105 further determines whether the shift amount of the detection area A exceeds a predetermined cancellation threshold value (S117). Then, when the shift amount exceeds the cancellation threshold value, the detection area setting unit 105 proceeds to the processing in the step S101 and initializes the detection area A as well as initializes the reset information.

Figure 5D:
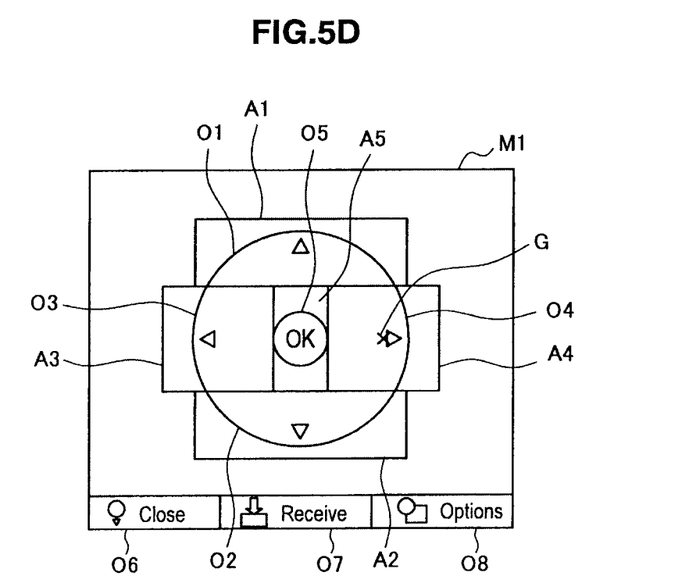
FIG. 5D is a diagram for explaining the remote control method consistent with the first embodiment of the present invention.

In the case where contact is not detected at the processing in the step S103 and reset information is set, the detection area setting unit 105 determines whether a predetermined cancellation time or initialization time has elapsed from the reset time (S119). When the cancellation time or initialization time has elapsed, the detection area setting unit 105 initializes the detection areas A of all the objects O as well as initializes the setting information to create one or more reset detection areas. In FIG. 5D, the detection areas A1 to A5 of the buttons O1 to O5 are initialized.

Here, the detection area setting unit 105 may gradually restore the detection areas A of all the objects O to the predetermined detection areas A within a predetermined restoration time, based on the reset information. In this case, information such as a restoration time, a restoration speed or the like is newly set as reset information.

As the aforementioned description, the case where the detection areas A of all the objects O are shifted has been described. In this case, when changing the operation target object Ot, the user U can continue a desired operation, even if the detection area A of the object O has been shifted, by intuitively changing the position of the pointer based on the relative positional relationship among the objects O.

In addition, only the detection area At of the operation target object Ot may be shifted. In this case, when the shifted detection area A is overlapped with the detection area A of a neighboring object O, the detection area At of the operation target object Ot is preferentially set (that is, the detection area A of the neighboring object O is reduced).

(Modification)

Figure 6A:
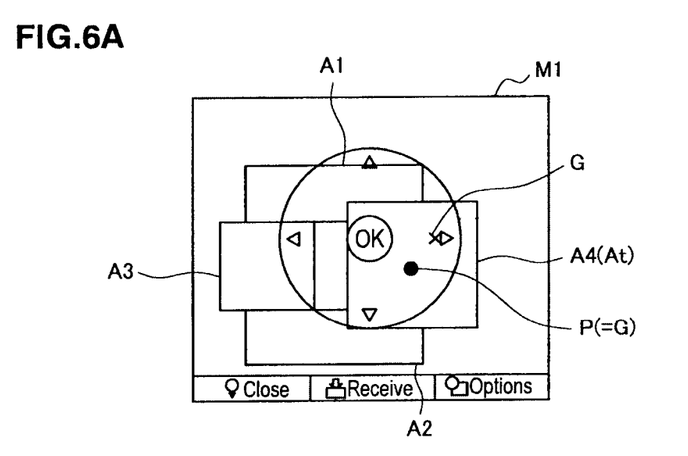
FIG. 6A is a diagram for explaining a remote control method consistent with a modification of the first embodiment of the present invention.
Figure 6B:
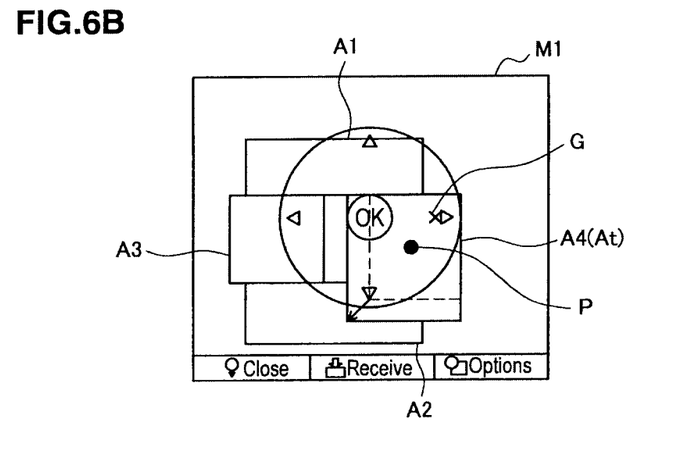
FIG. 6B is a diagram for explaining the remote control method consistent with the modification of the first embodiment of the present invention.
Figure 6C:
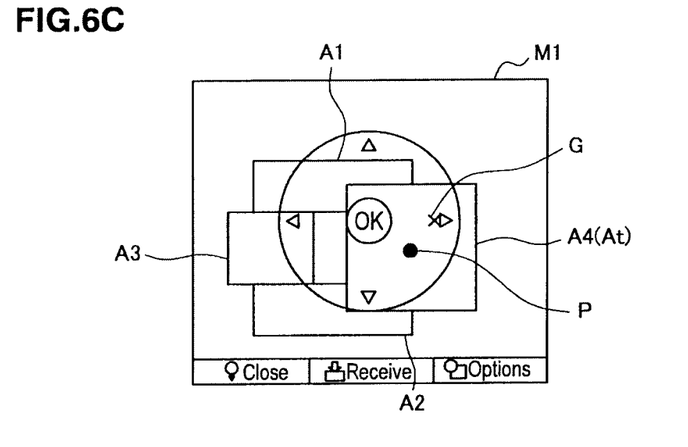
FIG. 6C is a diagram for explaining the remote control method consistent with the modification of the first embodiment of the present invention.

In the following, a remote control method consistent with a modification of the first embodiment of the present invention will be described with reference to FIGS. 6A to 6C. FIGS. 6A to 6C are explanatory diagrams for explaining the remote control method consistent with the modification of the first embodiment of the present invention. In the present modification, in the processing in the step S111 of the first embodiment, the detection area A is shifted, and the area of the detection area A is changed.

In an example shown in FIG. 6A, the detection area (At) of the button 4 (the operation target object Ot) is enlarged by a predetermined proportion, with the latest contact position P of the pointer as the center. In this case, the enlarged detection area A4 is overlapped with the detection areas A1 and A2 of the buttons O1 and O2 which are the neighboring objects, but the detection area A4 of the button O4 is preferentially set (that is, the detection areas A1 and A2 of the buttons O1 and O2 are reduced). This facilitates the user U to continue a desired operation in the case of continuously operating the same operation target object Ot.

In an example shown in FIG. 6B, the detection area A4 (At) of the button O4 (the operation target object Ot) is enlarged by the shift amount of the detection area A4, with the latest contact position P of the pointer as the center. For example, there is assumed a case where the shift amount is 20 dots to the left direction and 20 dots to the downward direction. In this case, the detection area A4 of the right button O4, after being set with the contact position P of the pointer at the time of the tap operation as the center, is enlarged so that the bottom-left corner is shifted by 20 dots in the left direction and 20 dots in the downward direction while maintaining the rectangular shape. This further facilitates the user U to continue a desired operation in the case of continuously operating the same operation target object Ot.

In an example shown in FIG. 6C, the detection area A4 (At) of the button O4 (the operation target object Ot) is enlarged, and at the same time, the detection areas A1 to A3 and A5 of the other objects O1 to O3 and O5 are reduced so as to maintain the total area of the detection areas A1 to A5 of all the objects O1 to O5. By this, visibility of the display data displayed on the display panel 101 can be maintained even when the detection area At of the operation target object Ot is enlarged.

In addition, in the above description, there has been described the case where the detection area A is shifted and the area of the detection area A is changed. However, only the area of the detection area A may be changed without the detection area A being shifted.

4. Second Embodiment

In the following, a remote control method consistent with a second embodiment of the present invention will be described with reference to FIG. 7 and FIGS. 8A to 8E. FIG. 7 and FIGS. 8A to 8E are a flow diagram and explanatory diagrams showing the remote control method consistent with the second embodiment of the present invention. In addition, in FIG. 7, the processing in the steps preceding the step S105 and the processing in the steps following the step S109 are omitted. In the second embodiment, change processing of the operation target object Ot is added in between the processing in the step S105 and the processing in the step S109 of the first embodiment.

Figure 7:
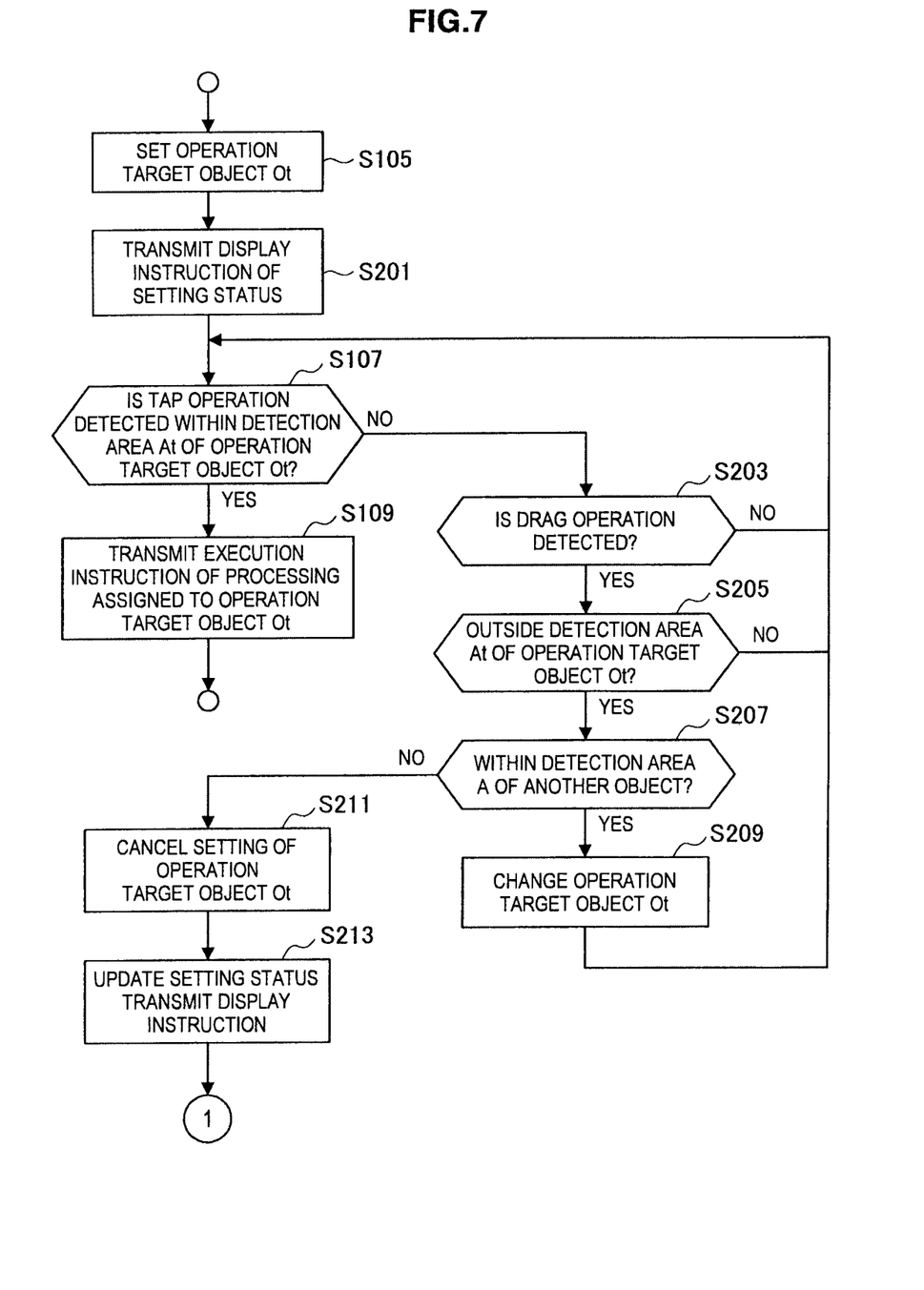
FIG. 7 is a flow diagram showing a remote control method consistent with a second embodiment of the present invention.

When an operation target object Ot is set in the processing of the step S105, the remote control unit 107 notifies the television 10 of the setting status of the operation target object Ot and a display instruction (S201). When having received the display instruction, the television 10 displays the setting status or other information associated with the object on the display 11 so that the setting status and/or information is visible to the user U.

When the setting status is displayed, the contact detection unit 103 determines whether a tap operation is detected within the detection area At of the operation target object Ot (S107). In the case where the tap operation is detected, the remote control unit 107 transmits to the television 10 an execution instruction of the processing assigned to the operation target object Ot (S109).

Figure 8A:
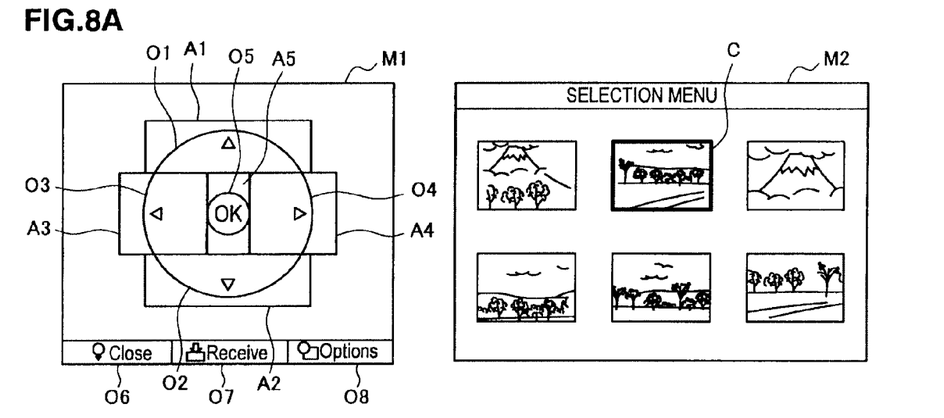
FIG. 8A is a diagram for explaining the remote control method consistent with the second embodiment of the present invention.
Figure 8B:
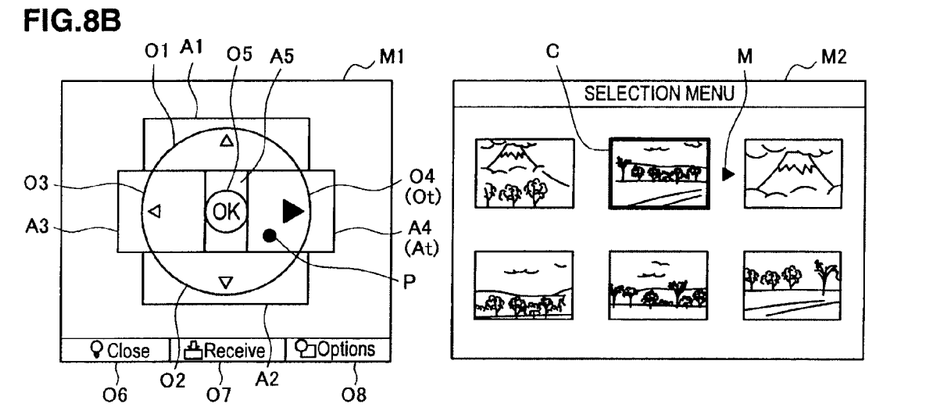
FIG. 8B is a diagram for explaining the remote control method consistent with the second embodiment of the present invention.
Figure 8C:
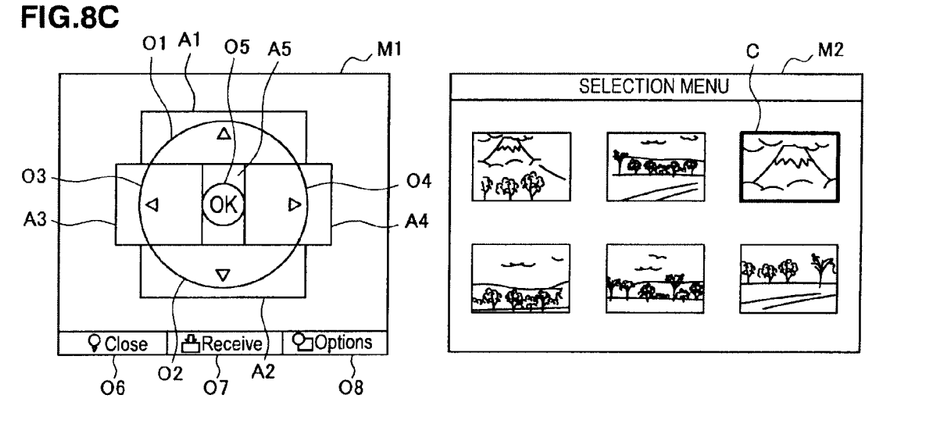
FIG. 8C is a diagram for explaining the remote control method consistent with the second embodiment of the present invention.

For example, at first, in FIG. 8A, the operation target object Ot is not set and only the cursor C is displayed on the thumbnail I in the selected state. Next, in FIG. 8B, the button O4 is set as the operation target object Ot and a right-pointing arrow M indicating the setting status is displayed on the right of the cursor C. Then, in FIG. 8C, a tap operation is detected and the cursor C has been moved to the right.

On the other hand, in the case where the tap operation is not detected in the processing of the step S107, the contact detection unit 103 determines whether a drag operation of the pointer is detected (S203). In the case where the drag operation is detected, the contact detection unit 103 determines whether the contact position P after the drag operation is outside the detection area At of the operation target object Ot (S205). In addition, if a negative determination result is obtained in the processing of the step S203 or S205, the processing returns to the step S107.

In the case of outside the detection area At of the operation target object Ot, the contact detection unit 103 determines whether the contact position P after the drag operation is within the detection area A of another object O (S207). Then, in the case of within the detection area A of another object O, the object O whose contact has been detected within the detection area A is newly set as an operation target object Ot (S209). Then, the processing returns to the step S201 and the setting status of the new operation target object Ot is displayed on the television 10.

Figure 8D:
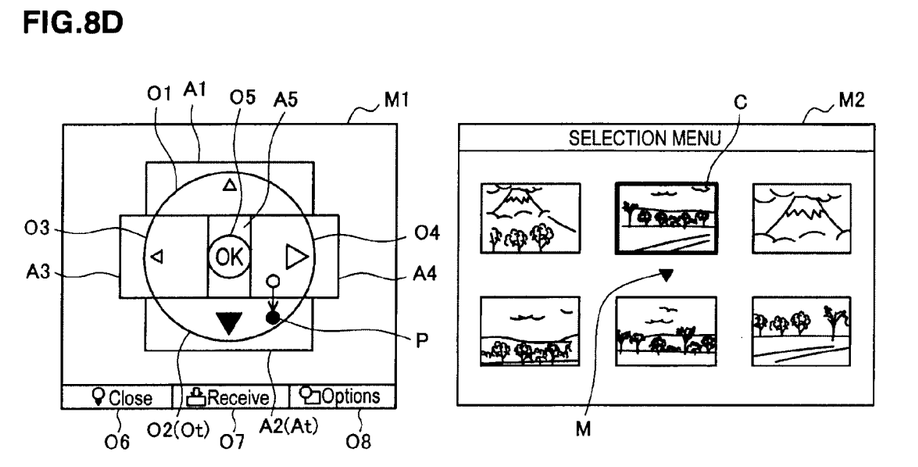
FIG. 8D is a diagram for explaining the remote control method consistent with the second embodiment of the present invention.

For example, in FIG. 8D, the buttons O2 is set as the operation target object Ot after the drag operation, and a downward-pointing arrow M indicating the setting status is displayed below the cursor C.

On the other hand, in the case of not within any of the detection areas of the other objects O, the preceding setting of the operation target object Ot is cancelled (S211). Then, the setting status of the operation target object Ot (a state in which no operation target object Ot exists) is displayed on the television 10 (S213), and the processing returns to the step S101.

Figure 8E:
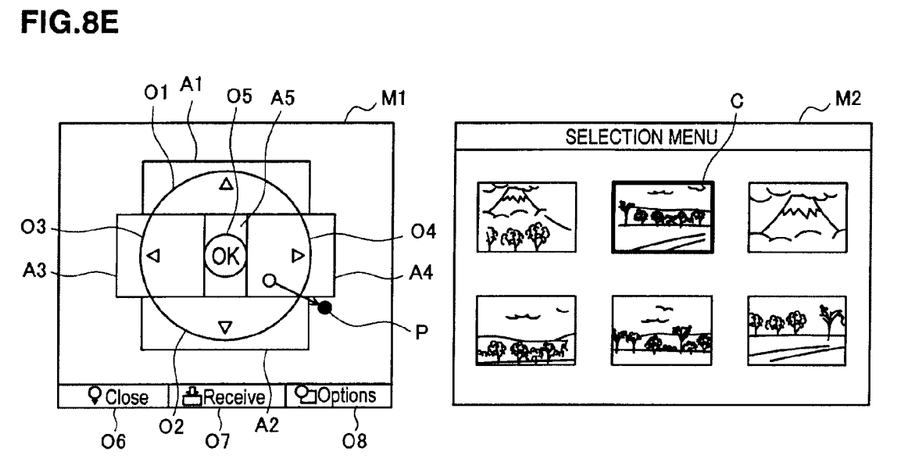
FIG. 8E is a diagram for explaining the remote control method consistent with the second embodiment of the present invention.

For example, in FIG. 8E, the operation target object Ot is not set after the drag operation, and the arrow M indicating the setting status of the operation target object Ot is not displayed. Then, in this case, even if a tap operation is detected, the cursor C does not move.

In the above description, the case of displaying the setting status around the cursor C has been described. This enables the user U, while paying attention to the television 10, to preliminarily confirm the operation target object Ot and change the operation target object Ot, preventing the occurrence of an erroneous operation. In addition, the setting status may be displayed at an arbitrary position other than around the cursor C so that the setting status is visible to the user U.

5. Summary

Consistent with embodiments of the present invention, in response to a tap operation within the detection area A of an object O, the detection area A of the object O is shifted to the side of the contact position P of the pointer at the time of the tapping, on the display panel 101. Accordingly, even if the position of the pointer is involuntarily moved through a continuous operation, a desired operation element (object O) is operable, and an erroneous operation is difficult to occur as well. Thus, the user U can continue a desired operation while paying attention to the television 10 to some extent.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the above description of the exemplary embodiments, there has been described the case of operating the up, down, left, and right move buttons O1 to O4 and an enter button O5 as the objects O. However, the present invention can be similarly applied to a case of operating buttons corresponding to ten numerical keys as the objects O.

Additionally, certain elements are shown as hardware, but one of ordinary skill in the art will recognize that the invention includes corresponding elements implemented as hardware, software, or combinations therefore.

Moreover, although the disclose embodiments including single elements performing multiple functions, one of ordinary skill in the art will recognize that the invention includes embodiments in which corresponding functions may be performed by separate elements.

The present application contains subject matter related to that disclosed in Japanese Priority Patent Application JP 2009-193429 filed in the Japan Patent Office on Aug. 24, 2009, the entire content of which is hereby incorporated by reference.

What is claimed is:

1. A user interface apparatus, comprising:
 a mobile display unit comprising an object display area, wherein:
  the mobile display unit displays a remote controller virtual object in the remote controller virtual object display area,
  the remote controller virtual object comprises a plurality of control keys associated with different user interface functions for controlling a separate stationary display unit by the user pressing the plurality of control keys on the mobile display unit;
 a detection area control unit that:
  defines a detection area for each control key of the remote controller virtual object, wherein the detection area includes a size and a location within the remote controller virtual object display area; and
  changes both the size and the location of the detection area of a respective control key of the plurality of control keys to create a modified detection area, wherein the modified detection area enlarges and redistributes the detection area of the respective control key of the plurality of control keys of the remote controller virtual object such that a user can control the stationary display unit by manipulating the plurality of control keys on the mobile display unit with minimized user input error while the user is concurrently viewing both the remote controller virtual object on the mobile display unit and associated content output on the stationary display unit; and
 an activation detection unit that detects a position of a user activation and a drag operation from the position of the user activation;
 wherein the detection area control unit changes the detection area of the respective control key after the activation detection unit detects the activation position as being within the detection area of the respective control key and detects that the drag operation ends outside of the detection area of the respective control key; and wherein both the size and location of the detection area of the respective control key are changed based on a location of the activation position within the detection area of the respective control key and a location at which the drag operation ends outside of the detection area of the respective control key.

2. The user interface apparatus of claim 1, wherein the mobile display unit changes at least one of the size and the location of the remote controller virtual object in the remote controller virtual object display area, based on the activation position, to create a modified remote controller virtual object.

3. The user interface apparatus of claim 2, wherein the mobile display unit modifies the remote controller virtual object to make an edge of the remote controller virtual object predetermined distance from the activation position.

4. The user interface apparatus of claim 2, wherein the mobile display unit modifies the remote controller virtual object such that a center of the remote controller virtual object is positioned at the activation position.

5. The user interface apparatus of claim 2, wherein:
the mobile display unit further comprises a second object display area, the display unit displaying a second object in the second object display area;
the detection area control unit defines a second detection area for the second object, the second detection area including the second object display area and having a second size and a second location;
the display unit changes at least one of a size and a location of the second object in the second object display area, based on the modified remote controller virtual object, to create a second modified object; and
the detection area control unit changes at least one of the second size and the second location of the second detection area, based on the modified detection area, to create a modified second detection area.

6. The user interface apparatus of claim 5, wherein:
the detection area has an area having a first value;
the second detection area has an area having a second value;
the modified detection area has an area having a third value;
the modified second detection area has an area having a fourth value; and
a sum of the first value and the second value equals a sum of the third value and the fourth value.

7. The user interface apparatus of claim 1, further comprising a communication unit that transmits a processing instruction, the processing instruction being based on the activation position.

8. The user interface apparatus of claim 7, wherein the processing instruction includes an instruction to display information associated with the remote controller virtual object.

9. The user interface apparatus of claim 1, wherein the detection area control unit:
determines whether the change in the at least one of the size and the location of the detection area exceeds a warning threshold value; and
generates a warning signal indicating that the change exceeds warning threshold value.

10. The user interface apparatus of claim 1, wherein the detection area control unit:

determines whether an initialization time has elapsed since the detection area control unit created the modified detection area; and
changes at least one of the size and the location of the modified detection area to create a reset detection area.

11. The user interface apparatus of claim 1, wherein the detection area includes only one remote controller virtual object.

12. The user interface apparatus of claim 1, wherein the at least one of the size and the location of the detection area are changed without changing at least one of the size and the location of the remote controller virtual object in the remote controller virtual object display area.

13. A method for controlling a user interface apparatus comprising:
displaying a remote controller virtual object in a remote controller virtual object display area, wherein the remote controller virtual object comprises a plurality of control keys associated with different user interface functions for controlling a separate stationary display unit by the user pressing the plurality of control keys on the mobile display unit;
defining a detection area for each control key of the remote controller virtual object, the detection area including a size and a location within the remote controller virtual object display area;
detecting a position of a user activation and a drag operation from the position of the user activation; and
after detecting the activation position as being within the detection area of a respective control key of the plurality of control keys:
changing both the size and the location of the detection area of the respective control key to create a modified detection area, wherein the modified detection area enlarges and redistributes the detection area of the respective control key of the plurality of control keys of the remote controller virtual object such that a user can control the stationary display unit by manipulating the plurality of control keys on the mobile display unit with minimized user input error while the user is concurrently viewing both the remote controller virtual object on the mobile display unit and associated content output on the stationary display unit; and
generating a command signal;
wherein the at least one of the size and location of the detection area of the respective control key is changed based on a location of the activation position within the detection area of the respective control key and a location at which the drag operation ends outside of the detection area of the respective control key.

14. The method of claim 13, further comprising:
changing at least one of the size and the location of the remote controller virtual object in the remote controller virtual object display area, based on the activation position, to create a modified remote controller virtual object comprising the plurality of enlarged and redistributed control keys.

15. The method of claim 14, further comprising:
displaying a second object in the second object display area;
defining a second detection area for the second object, the second detection area including the second object display area and having a second size and a second location;
changing at least one of a size and a location of the second object in the second object display area, based on the modified remote controller virtual object, to create a second modified object; and changing at least one of the second size and the second location of the second detection area, based on the modified detection area, to create a modified second detection area.

16. The method of claim 13, further comprising:

transmitting a processing instruction, the processing instruction being based on the activation position and including an instruction to display information associated with the remote controller virtual object.

17. The method of claim 13, further comprising:

determining whether the change in the at least one of the size and the location of the detection area exceeds a warning threshold value; and generating a warning signal after determining that the change exceeds warning threshold value.

18. The method of claim 13, further comprising:

determining whether an initialization time has elapsed since creation of the modified detection area; and changing at least one of the size and the location of the modified detection area to create a reset detection area, the reset detection area having a predetermined size and a predetermined location.

19. A non transitory computer-readable medium tangibly embodied in a storage device encoded with instructions which, when executed on a processor, perform a method for controlling a user interface apparatus, the method comprising:

generating a signal to display a remote controller virtual object in a remote controller virtual object display area of a mobile display unit, wherein the remote controller virtual object comprises a plurality of control keys associated with different user interface functions for controlling a separate stationary display unit by the user pressing the plurality of control keys on the mobile display unit;

generating a signal to define a detection area for each control key of the remote controller virtual object, the detection area including a size and a location within the remote controller virtual object display area;

generating a signal to change both the size and the location of the detection area of a respective control key of the plurality of control keys to create a modified detection area, wherein the modified detection area enlarges and redistributes the detection area of the respective control key of the plurality of control keys of the remote controller virtual object such that a user can control the stationary display unit by manipulating the plurality of control keys on the mobile display unit with minimized user input error while the user is concurrently viewing both the remote controller virtual object on the mobile display unit and associated content output on the stationary display unit;

generating a signal to detect a position of a user activation and a drag operation from the position of the user activation; and determining from received signals that the activation position is within the detection area of the respective control key;

wherein the at least one of the size and location of the detection area of the respective control key is changed based on a location of the activation position within the detection area of the respective control key and a location at which the drag operation ends outside of the detection area of the respective control key.

20. The computer-readable medium of claim 19, wherein the method further comprises changing at least one of the size and the location of the remote controller virtual object in the remote controller virtual object display area, based on the activation position, to create a modified remote controller virtual object.

21. The computer-readable medium of claim 20, wherein the method further comprises transmitting a processing instruction, the processing instruction being based on the activation position and including an instruction to display information associated with the remote controller virtual object.

22. The computer-readable medium of claim 21, wherein the method further comprises:

determining whether the change in the at least one of the size and the location of the detection area exceeds a warning threshold value;

generating a warning signal determining that the change exceeds warning threshold value;

determining whether an initialization time has elapsed since creation of the modified detection area; and changing at least one of the size and the location of the modified detection area to create a reset detection area, the reset detection area having a predetermined size and a predetermined location.

* * * * *